July 8, 1958 G. J. NEUVIRTH 2,842,656
INERT GAS-ARC WELDING APPARATUS AND A SHIELD
AND AN ELECTRODE HOLDING CHUCK FOR
USE IN SAID APPARATUS
Filed July 25, 1956 2 Sheets-Sheet 2
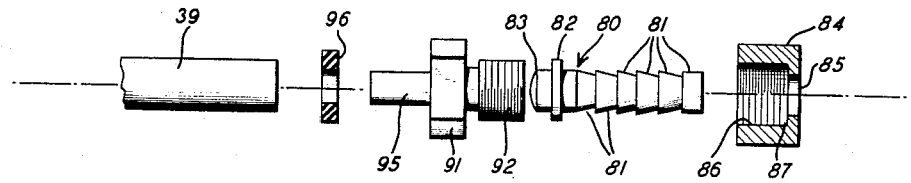
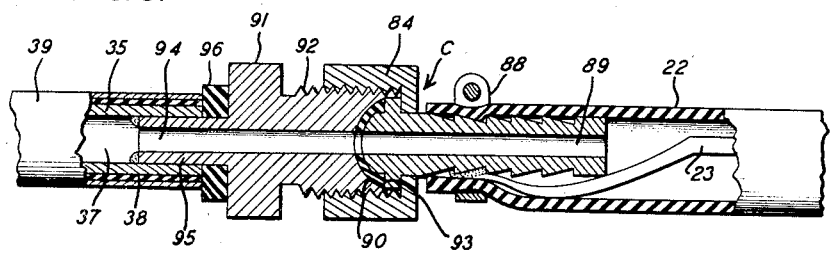
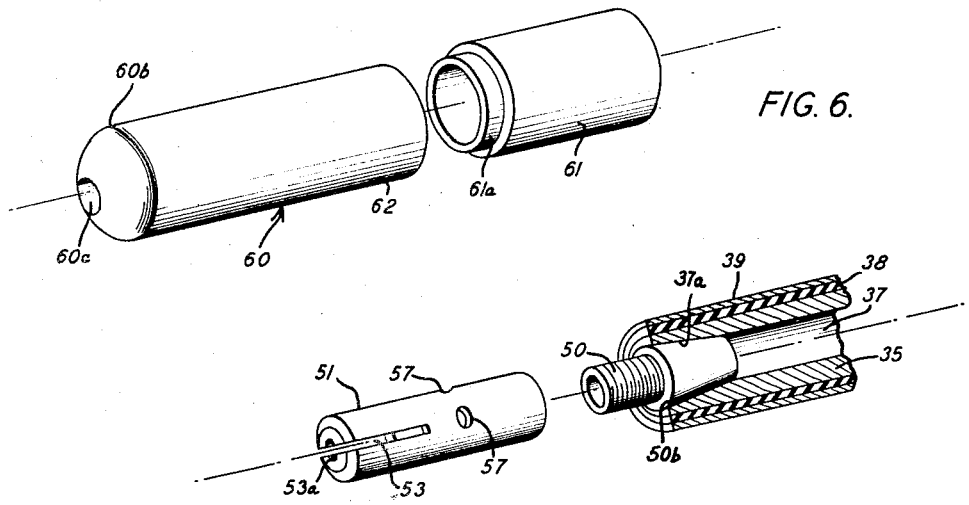
INVENTOR
GEORGE J. NEUVIRTH
BY Thomas F. Healy
ATTORNEY United States Patent Office 2,842,656
Patented July 8, 1958

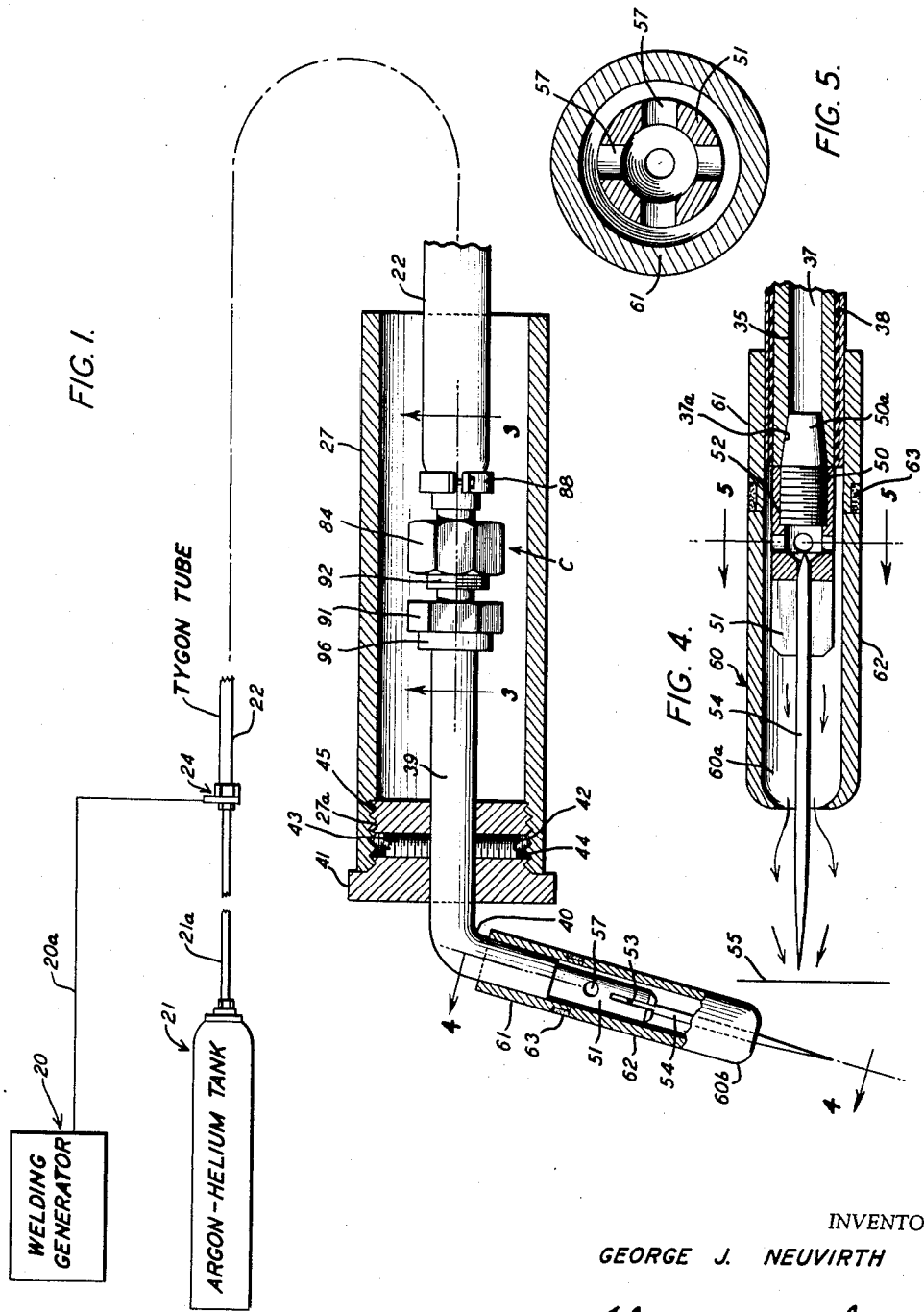

2,842,656

INERT GAS-ARC WELDING APPARATUS AND A SHIELD AND AN ELECTRODE HOLDING CHUCK FOR USE IN SAID APPARATUS

George J. Neuvirth, Lodi, N. J.

Application July 25, 1956, Serial No. 600,143

3 Claims. (Cl. 219—75)

The present invention relates to an inert gas-arc welding apparatus and to a shield and an electrode holding chuck for use in said apparatus and is a continuation-in-part of my application Serial No. 352,196, filed on April 30, 1953.

The prior art recognizes that inert gas-arc welding devices are generally old. In this connection, attention is directed to Patent No. 2,444,767, issued July 6, 1948, to Richard W. Cobean. The Cobean patent points out that it is recognized that when welding readily oxidizable metals such as magnesium, aluminum or alloys containing a substantial amount of either of these metals, it is desirable to establish the arc between the work and a substantially non-consuming electrode, such as tungsten or carbon, and to surround the arc and the molten portions of the work with an inert gas atmosphere such as helium or argon gas. Cobean further points out that when welding complicated assemblies, such as airplane structures, it is desirable to have a well-balanced torch of a small size and light weight which is fully insulated so that in confined places the welder may readily manipulate the torch without undue fatigue and without danger of damaging the work or the torch due to short circuits between the torch and the work. Cobean further points out that a fully insulated torch also protects the welders from the danger of accidental shock.

With adequate gas shielding, electrode consumption is at a very low rate and the length of the electrode which it is possible to enclose in the shield is adequate for many hours or even many days of welding. As Cobean indicates, this electrode may be made of tungsten or carbon, or the like.

During the welding operation the end of the electrode becomes semi-molten and it becomes necessary in time to adjust the electrode in its holder. The adjustment of the electrode in its holder, and the adjustment of the shield relative to the arcing terminal of the electrode is of considerable importance. If the arcing terminal of the electrode does not extend a suitable distance through the opening in the end of the electrode shield, the shield may become overheated, whereas if the extension is greater than necessary for visibility, an excessive amount of inert gas may be required for adequate protection of the electrode and the work. As the electrode is used, the shield may be pushed back to maintain the desired electrode extension. When the shield has been pushed back as far as it will go, the electrode may be pulled out of its holder, until it again extends the correct distance to re-establish desired welding operating conditions.

My gas-arc welding device is an improvement over the gas arc-welding apparatus shown and described in the Cobean Patent 2,444,767. I have found that it is possible to overcome many of the disadvantages that the art recognizes with reference to the proper disposition of the electrode with reference to the work and the electrode shield, and providing the proper amount of inert gas necessary to protect the work during arc-welding operation.

I have discovered that many of the disadvantages of the prior arc welding devices can be overcome by the use of my electrode shield. The electrode shield of the present invention is composed of two sections of non-oxidizable metals or alloys having a high melting point, joined by a suitable brazing material. In use, my electrode shield will not freeze when hot and therefore the hot shield can be readily and easily adjusted with reference to the electrode point, as it is consumed to maintain the most efficient gas-arc welding conditions at the work surface, without wasting time to permit the electrode shield to cool.

Therefore, it is one of the objects of the present invention to provide a shield for the electrode of an inert gas arc-welding apparatus consisting of, a cylindrical body portion having a passageway extending longitudinally therethrough, said cylindrical body portion including a brass section and a stainless steel section brazed together with silver or silver alloy brazing material, said stainless steel section being reduced at the open end thereof to provide an inert gas orifice of less diameter than the inside diameter of said passageway extending through said cylindrical body portion.

Still a further object is to provide a shield for the electrode of an inert gas-arc welding apparatus comprising, a body portion having an opening extending longitudinally therethrough, said body portion being composed of a difficult to oxidize metal section and a second difficult to oxidize metallic section having a different co-efficient of expansion, said sections being brazed together.

Another object is to provide a shield for the electrode of an inert gas-arc welding apparatus, comprising, a body portion having an opening extending longitudinally thereto, said body portion being composed of a brass section and a stainless steel section joined together by silver brazing material.

Still another object is to provide an electrode holding chuck comprising, a body portion provided with an opening extending longitudinally therethrough, said opening being reduced at one end thereof, said body portion being provided with a plurality of gas orifices, and said body portion being split on opposite sides with said splits longitudinally extending from the reduced open end of said body portion.

Yet another object is to provide an electrode holding chuck comprising, a body portion provided with an opening extending longitudinally therethrough, said body portion being provided with gas orifice means, and said body portion being split on opposite sides thereof to provide spring means for holding an electrode in said chuck.

Still another object is to provide an inert gas-arc welding device which is easy and economical to operate, and so constructed and designed that it may be easily assembled and disassembled when desired.

Other and further objects and advantages of the present invention will be apparent from the following description thereof.

In the drawing, wherein like numerals refer to like or corresponding parts throughout the several views:

Figure 1 is a sectional view showing the gas-arc welding device embodying the features of the present invention, with a portion diagrammatically showing how the said gas-arc welding device is connected with an inert gas and electrical supply;

Figure 2 is an exploded view of the parts of the coupling means connecting the Tygon tube and conductor from the inert gas-electrical supply for conducting the inert gas and the electric current to the business end of the gas-arc welding device;

Figure 3 is a section along the line 3—3 of Figure 1 in the direction of the arrows;

Figure 4 is a section along the line 4—4 of Figure 1 in the direction of the arrows;

Figure 5 is a section along the line 5—5 of Figure 4 in the direction of the arrows;

Figure 6 is an exploded perspective view of the electrode shield embodying the features of the present invention; and Figure 7 is an exploded perspective view of the chuck showing how the chuck is connected to the copper tube which carries the current and inert gas to the business end of the apparatus.

Referring now to the drawing, the numeral 20 generally indicates a welding generator, while the numeral 20a represents an electrical conduit for taking electricity from generator 20. The numeral 21 generally indicates an argon-helium tank to supply inert gas to the work surface being welded, while the numeral 21a represents the gas tube leading from tank 21 for supplying inert gas for the welding operation.

The numeral 22 indicates a flexible Tygon tube encasing a flexible electrical conductor 23. The electrical conductor 23 may be a flexible copper wire.

The numeral 24 generally indicates an electrical-gas coupling means to transfer the inert gas from tube 21a into the Tygon tube 22 and the electricity from the electrical conduit 20a from the generator to the copper wire 23 within the Tygon tube 22. This electric-gas coupling means does not per se comprise a part of the present invention and any sutable coupling means may be employed, as for example the means shown and described in the Cobean Patent 2,444,767.

The Tygon tube 22 and the electrical conductor 23 may be of any suitable length depending upon how far the work is disposed from the welding generator 20 and the gas tank 21.

The Tygon tube 22, at the end thereof which is remote from the coupling means 24 is connected to a coupling means so constructed and designed as to enable the inert gas flowing through tube 22 and the electric current flowing through the conductor 23 to be transferred to the business end of the gas-arc welding device.

As best shown in Figures 2 and 3 of the drawing, this coupling means has been generally indicated by C and comprises a copper plug or metal member which is generally indicated by the numeral 80, said plug 80 being elongated and being provided with a plurality of segments or step-down sections 81 extending throughout the major portion of the length of plug 80. Plug 80 is provided intermediate the ends thereof with a flange or lip 82 which is disposed near the convex or male portion 83 of plug 80. The coupling C also comprises a nut 84, which is perforated at 85, and internally threaded at 86, being adapted to fit over the segments 81 of the plug 80, in such a manner that the flange 82 bears against the internal shoulder 87 of nut 84, when the coupling C is in joined together position.

As more clearly shown in Figure 3 of the drawing, the flexible electrical conductor 23 bears against the plug 80 so as to complete the current flow, and Tygon tube 22 is positioned around the major portion of the plug 80, and more particularly around the segments 81 thereof. Clamp 88 is adapted to clamp Tygon tube 22 and the copper wire 23 snugly against one of the segments 81 of plug 80, in such a manner that there is no gas leakage.

Plug 80 is provided with a gas passageway 89, extending longitudinally therethrough, to permit the argon or helium gas to flow from the tube 22 into said gas passageway 89 extending through plug 80.

The male portion 83 of plug 80 is adapted to fit in the concave or female portion 90 of a connecting nut member 91 which is externally threaded at 92 to engage the internal threads 86 of nut coupling 84. A seal member 93 is disposed between the convex portion 83 of plug 80 and the concave portion 90 of nut element 91.

The nut coupling or element 91 is provided with a longitudinally extending gas passageway 94, which is in registry with the gas passageway 89, so that inert gas may flow from tube 22 through gas passageways 89 and 94.

The nut coupling 91 is provided with an axially extending portion 95 which has a copper tube 35 soldered thereto and is additionally provided with a Bakelite seal 96 positioned therearound in such a manner as to prevent any gas leakage at the jointure.

The joint coupling C is disposed within an insulating hand element 27, which is made of Bakelite, or any other insulating material.

Asbestos wrapping 38 is disposed around the copper tube 35 throughout its length so as to provide insulation against accidental shock, as the copper tube 35 carries both the electric current and the inert gas for the welding operation. Encasing the copper tube 35 and the asbestos wrapping 38 is a shield 39 which together with tube 35 is bent at an angle at 40 so as to dispose the gas and electric current in a proper position for an efficient welding operation.

Plug 41 is disposed around the shield tube 39, said plug 41 being disposed on said tube 39 near the bend 40, with said plug 41 being threadedly apertured on opposite sides thereof at 42 so that the screws 43 and 44 may fix the plug 41 so that it will not accidentally move along the length of shield tube 39. Plug 41 is provided with an externally threaded portion 45 adapted to engage the internally threaded portion 27a of hand element 27, so that the hand element 27 may be unscrewed from the plug 41 when it is desired to disassemble the device. Plug 41 may be moved along tube 39 by first unscrewing set screws 43 and 44. In this manner hand element 27 can be moved nearer or farther away from the business end of the gas-arc welding device.

As best shown in Figure 4 of the drawing, the copper tube 35 has a longitudinally extending gas passageway 37 terminating in an outwardly tapered end portion 37a which frictionally receives the correspondingly tapered end portion 50a of a tubular insert 50b having an externally threaded end portion 50. The insert 50b is wedge fitted into the end of the tube 35. An electrode holding chuck 51, is provided at one end thereof with an internally threaded recessed portion 52 adapted to threadedly engage with the threaded portion 50, so as to complete the coupling of said copper tube 35 with the electrode holding chuck 51.

As best shown in Figure 7 of the drawing, the electrode holding chuck 51 is longitudinally split through a portion of the length thereof as shown by the numeral 53 to provide some spring to the chuck so as to firmly hold the electrode needle 54 in place during the welding operation. The electrode needle 54 is reversible, being pointed at both ends. When the electrode 54 requires adjustment or changing, it may be desirable to withdraw it from the chuck 51 and reverse the position so as to provide a new electrode point for use in arc welding the work 55.

The longitudinally extending splits 53 on opposite sides of the wall of the chuck 51 extend from the reduced opening 53a along the length of the chuck 51 to a point near the four gas openings 57 which, as shown in Figure 5 of the drawing, are 90° apart. The chuck 51 is provided with a longitudinally extending passageway throughout the length thereof, with a reduced opening 53a, as shown in Figure 7 of the drawing, to provide a gripping means for electrode 54 which is disposed in said opening 53a in chuck 51. Electrode 54, which is springily held in chuck 51, is so disposed with reference to the gas orifices 57, as to not interfere with the flow of inert gas through said openings 57.

A very important part of my invention is the provision of a shield generally indicated by the numeral 60. The electrode covering shield 60 is provided with a longitudinally extending opening 60a extending therethrough. Said shield 60 is bevelled at one end thereof, said bevelled portion being designated as 60b, with said shield having a reduced opening 60c in one end thereof, so constructed with reference to the shield as to provide the proper umbrella of inert gas around the point of the electrode 54 extending therethrough.

The shield 60 is made up of a brass section 61 and a stainless steel or high melting point steel alloy section 62, with said brass section 61 being provided with a turned down portion 61a which is adapted to bear against the end of steel section 62 to provide a seat for the silver brazing material 63, as best shown in Figures 4 and 6 of the drawing.

The electrode covering shield 60 encompasses the chuck 51 and a portion of the electrode 54 and has a snug fit over the free end portion of the shield tube 39. The fit of the shield 60 on the tube 39 is such that the shield 60 can be intentionally axially moved with respect to the tube 39 but is frictionally retained against accidental displacement from its selected position. The shield 60 can be easily removed from the tube 39 and from around the electrode 54 and chuck 51.

The construction and composition of shield 60 is very important. The co-efficient of expansion of the section 62 and the brass section 61 is such that these two metals do not freeze when hot, particularly when joined together with silver brazing material. This features makes it possible to quickly adjust the hot shield, with reference to the electrode point, therefore increasing the speed of handling when it is desired to change the electrode 54, or make some other electrode or shield adjustment. It has also been found that the shield 60, being composed of the steel alloy section and the brass section, withstands oxidation, therefore increasing the useful life of the shield 60 in the gas-arc welding operation.

As shown in Figure 4, the brass section is the top section, while the steel section is the bottom section, surrounding the electrode needle 54 at the point where the inert gas flows through the gas orifice 60c in the end of the shield 60.

The brass section or portion of the shield 60 is composed of 83.31% copper, 1.05% silicon, .88% nickel, 12.81% zinc, .95% aluminum, and a trace of iron.

The section 62 may be stainless steel composed of .09% carbon, 1.64% manganese, 13.00% nickel, 17.93% chromium, .62% titanium, and 66.72% iron. The section 62 may also be composed of AISI 310 347 321 309 Inconel Monel, etc.

In the general operation of the gas-arc welding device of the present invention, the Tygon tube 22 and the conductor 23 are coupled into the coupling means 24. The welding generator 20 and the inert gas tank 21 are put into operation to energize the copper conductor 23 and to pass the inert gas into the Tygon tube 22. The electrical current from the generator 20 flows through the copper conductor 23, through the plug 80 and coupling unit 84, through nut element 91, through the copper tube 35, through the chuck 51, to the electrode 54, which electrode 54 is adapted for use with work 55, to permit needle-like precision in the welding operation. The inert gas flows through the Tygon tube 22, the gas passageway 89, the gas passageway 94, the gas passageway 37 in the copper tube 35, the insert 50b through the orifices 57 in chuck 51, and through gas passageway 60a in shield 60, through opening 60c in the end of shield 60 to surround the business end of electrode needle 54 with inert gas at the work point 55.

When it is desired to disassemble the device, the hand element 27 is unscrewed from the plug 41, with said hand element 27 being moved away from plug 41 and over tube 22, to permit access to the coupling means C. Nut element 91 may be unscrewed from member 84 to remove the electrode holding assembly from the plug 80.

When it is again desired to put the welding device into operation, it is merely necessary to reverse this disassembling procedure as outlined above.

While the electrode shield is of primary importance, my invention also covers the electrode holding chuck, as well as my complete gas-arc welding device. My complete arc welding device has an advantage over prior art devices from a standpoint of simplicity in operation, cost of manufacture, easy maneuverability, greater life and ease with which it may be disassembled for replacing parts or at the end of a welding job. In consideration of the particular size and structure of the various parts which comprise my gas-arc welding device, it is possible to perform extremely precise welding operations, in an atmosphere of inert gas in such a manner that the electrode lasts considerably longer than electrodes of prior art devices, and at the same time, there is less inert gas used in the over-all welding operation.

In order to bring about the proper needlepoint welding, it is important to have the shield for the electrode constructed and designed with balanced dimensions. It is preferred that the shield for the electrode of the inert gas-arc welding apparatus consist of a cylindrical body portion having a length of approximately one and one-fourth inches and being provided with a passageway extending longitudinally therethrough, said cylindrical body portion having an inside diameter of approximately one-fourth of one inch, said cylindrical body portion having an outside diameter of approximately three-eighths of one inch, with said cylindrical body portion including a brass section and a steel alloy section brazed together with silver brazing material, said steel section being reduced at the open end thereof to provide an inert gas orifice having a diameter of approximately three-sixteenths of an inch, said brass section having a length of approximately one-half of one inch, and said steel section having a length of approximately three-fourths of one inch.

It is one of the concepts of the present invention to provide an inert gas-arc welding device, comprising, an electrode holding chuck, an electrode removably carried by said chuck, a shield for said chuck and electrode, a conductor tube adapted to be connected to said chuck, a shielding tube for said conductor tube, means for coupling said conductor tube to an electrical supply source, a hand element engaging over a portion of said shielding tube and over said coupling means, said hand element being internally threaded at one end portion thereof, a threaded plug slidably carried by said shielding tube, means to selectively lock said plug against movement along said shielding tube, with said plug being adapted to threadedly engage said hand element.

Tygon tubing, as used herein, refers to a corrosion resistant tubing made from synthetic resins from a series of modified halide polymers, condensation resins, and diene derivatives.

The following brazing materials can be used to braze together the two sections of the shield:

| Brazing Filler Metals Classification | Chemical Composition | | | | |
|---|---|---|---|---|---|
| | Ag | Cu | Zn | Cd | Other |
| BAg-1 | 45 | 15 | 16 | 24 | |
| BAg-1a | 50 | 15.5 | 16.5 | 18 | |
| BAg-2 | 35 | 26 | 21 | 18 | |
| BAg-3 | 50 | 15.5 | 15.5 | 16 | Ni3 |
| BAg-4 | 40 | 30 | 28 | | Ni2 |
| BAg-5 | 45 | 30 | 25 | | |
| BAg-6 | 50 | 34 | 16 | | |
| BAg-7 | 56 | 22 | 17 | | Sn5 |
| BAg-8 | 72 | 28 | | | |
| BAg-9 | 65 | 20 | 15 | | |
| BAg-10 | 70 | 20 | 10 | | |
| BAg-11 | 75 | 22 | 3 | | |

Other and further modifications of the present invention will be apparent to those skilled in the art without departing from the spirit thereof, and it is therefore de-

What is claimed is:
1. An inert gas-arc welding device comprising, a cylindrically shaped electrode holding chuck having an internally threaded end portion, a reversible electrode removably carried by said chuck, a shield for said chuck and electrode, a copper conductor tube, an insert extending from said conductor tube externally threaded at one end and engaging the internally threaded end portion of said chuck, an asbestos wrapping around said copper tube, a shielding tube for said asbestos covered copper tube, said shielding tube being bent at an angle at one end portion thereof, coupling means, said copper tube being connected to a coupling means, a hand element engaging over a portion of said shielding tube and over said coupling means, said hand element being internally threaded at one end portion thereof, a threaded plug slidably carried by said shielding tube, means to selectively lock said plug against movement along said shielding tube, and said plug threadedly engaging said hand element.

2. An inert gas-arc welding device comprising, a cylindrically shaped electrode holding chuck having an internally threaded end portion, a reversible electrode removably carried by said chuck, a shield for said chuck and electrode, said shield comprising a cylindrical body portion composed of a brass section joined to a stainless steel section and having an opening extending longitudinally therethrough, a copper conductor tube, an insert extending from said conductor tube, externally threaded at one end and engaging the internally threaded end portion of said chuck, an asbestos wrapping around said copper tube, a shielding tube for said asbestos covered copper tube, coupling means, said shielding tube being connected to said coupling means, a hand element engaging over a portion of said shielding tube and over said coupling means, said hand element being internally threaded at one end portion thereof, a threaded plug slidably carried by said shielding tube, means to selectively lock said plug against movement along said shielding tube, and said plug threadedly engaging said hand element.

3. An inert gas-arc welding device comprising, a cylindrically shaped electrode holding chuck, an electrode removably carried by said chuck, a shield for said chuck and electrode, said shield comprising a cylindrical body portion composed of a brass section joined to a stainless steel section and having an opening extending longitudinally therethrough, a conductor tube connected to said chuck, a shielding tube for said conductor tube, means coupling said conductor tube to an electrical supply source, a hand element engaging over a portion of said shielding tube and over said coupling means, said hand element being internally threaded at one end portion thereof, a threaded plug slidably carried by said shielding tube, means to selectively lock said plug against movement along said shielding tube, and with said plug threadedly engaging said hand element.

References Cited in the file of this patent

UNITED STATES PATENTS

| | | |
|---|---|---|
| 910,434 | Thompson | Jan. 19, 1909 |
| 2,307,553 | Weller | Jan. 5, 1943 |
| 2,376,265 | Meredith | May 15, 1945 |
| 2,444,767 | Cobean | July 6, 1948 |
| 2,659,797 | Anderson et al. | Nov. 17, 1953 |